United States Patent [19]
Masaki et al.

[11] Patent Number: 5,534,764
[45] Date of Patent: Jul. 9, 1996

[54] VEHICLE DRIVING CONTROL SYSTEM HAVING FUNCTION FOR SUPPRESSING VIBRATION

[75] Inventors: Ryoso Masaki, Hitachi; Nobuyoshi Mutoh, Hitachinaka; Sanshiro Obara, Toukai-mura, all of Japan

[73] Assignee: Hitachi, Ltd., Tokyo, Japan

[21] Appl. No.: 350,606

[22] Filed: Dec. 7, 1994

[30] Foreign Application Priority Data

Dec. 9, 1993 [JP] Japan .................................. 5-308876

[51] Int. Cl.⁶ ........................................................ H02P 05/34
[52] U.S. Cl. ........................ 318/802; 318/432; 318/139; 180/170; 364/426.04
[58] Field of Search ...................... 318/139, 254, 318/432, 800, 799, 798, 801, 802; 180/197, 142, 246, 170; 364/424.05, 426.03, 426.04, 426.02

[56] References Cited

U.S. PATENT DOCUMENTS

| | | | |
|---|---|---|---|
| 3,753,064 | 8/1973 | Agarwal et al. | 318/799 |
| 4,771,848 | 9/1988 | Namba et al. | 364/426.04 |
| 4,951,199 | 8/1990 | Whitehead | 180/142 |
| 4,989,686 | 2/1991 | Miller et al. | 180/197 |
| 5,388,658 | 2/1995 | Ando et al. | 364/426.03 |

FOREIGN PATENT DOCUMENTS 64-74005  3/1989  Japan .

OTHER PUBLICATIONS

Transactions of Japan Society of Mechanical Engineers vol. 53, No. 492 (Aug. 1987) Paper No. 86–0514A.

*Primary Examiner*—John W. Cabeca
*Attorney, Agent, or Firm*—Antonelli, Terry, Stout & Kraus

[57] ABSTRACT

A vehicle control system for driving an electric vehicle having driving force generating means for driving the vehicle, accumulating means for accumulating driving energy for said vehicle, means for supplying the energy of said accumulating means to said driving force generating means, and control means for controlling said supplying means using a torque command generated by said driving force generating means. The control means includes a vehicle model simulating the operation of said vehicle under the torque generated by said driving force generating means and torque command calculating means for calculating said torque command using a value of vehicle model speed calculated by said vehicle model and the rotating speed of said driving force generating means.

10 Claims, 8 Drawing Sheets

VEHICLE DRIVING CONTROL SYSTEM HAVING FUNCTION FOR SUPPRESSING VIBRATION

BACKGROUND OF THE INVENTION

The present invention relates to a vehicle driving control system which is capable of suppressing vibration and, more particularly, to a vehicle driving control system which is suitable for improving the driving operability of the vehicle by suppressing vibration caused by the distortion of the drive shaft in a vehicle driven by a motor with a battery or an internal combustion engine.

In driving an electric vehicle, distortion of a drive shaft causes vibration during starting of the vehicle in some cases. The vibration is caused by distortion in the drive shaft and deformation in a supporting body placed between the driving force generating means, such as a motor, engine or the like, and the body of the vehicle.

Various methods of suppressing such a vibration are described in Japanese Patent Application Laid-Open No. 64-74005 (1989) and in the Transactions of the Japan Society of Mechanical Engineers (Series B) Vol. 53, No. 492 (August 1987) Paper No. 86-0514A. The former Publication discloses a method in which the vibration is decreased by controlling a torque command to oppose the vibration of the vehicle using the value of acceleration of the vehicle motor. The latter Publication discloses a method in which, to suppress a similar vibration in a vehicle driven by a diesel engine, a governor command (speed command) of the diesel engine is compensated using the difference between actual vehicle speed and a vehicle speed value calculated from the rotating speed of the diesel engine.

In the former method, since it is required to detect the acceleration of the motor from the speed of the motor, noise components in the detected value cause a problem. For example, when the acceleration is detected from the motor speed, a motor sensor capable of motor speed with a high accuracy and at a high speed is required, since the motor speed has to be determined by differential processing. On the other hand, although the latter method has an advantage in that there is no need to detect the motor acceleration, it requires detection of the actual vehicle acceleration and, therefore, required that a circuit for detecting the actual vehicle acceleration be added to the control unit. Further although a case of using a gearbox is described in the latter Publication, it is difficult to easily estimate how to apply that method to a case in which the actual vehicle speed is not used.

SUMMARY OF THE INVENTION

For an electric vehicle, the first object of the present invention is to provide a vehicle control system which is capable of suppressing a vibration of the vehicle only by detecting the speed of driving force generating means, such as electric motor.

For a vehicle having a gearbox, the second object of the present invention is to provide a vehicle control system which is capable of preventing vibration of the vehicle at any time, even when the gear ratio is changed.

The first object of the present invention can be attained by providing a vehicle control system having a driving force generating means for driving the vehicle, accumulating means for accumulating driving energy for said vehicle, means for supplying the energy of said accumulating means to said driving force generating means, and control means for controlling said supplying means using of torque command to be generated by said driving force generating means, wherein said control means performs control by calculating a vehicle model simulating the operation of said vehicle under the torque generated by said driving force generating means and calculating said torque command using a vehicle model speed calculated by the vehicle model and the rotating speed of said driving force generating means.

The second object of the present invention can be attained by providing a vehicle control system having a driving force generating means for driving a the vehicle, gear-shifting means for transmitting the driving force of said driving force generating means through gear-shifting to said vehicle, accumulating means for accumulating driving energy for said vehicle, means for supplying the energy of said accumulating means to said driving force generating means, and control means for controlling said supplying means using a torque command to be generated by said driving force generating means, wherein said control means performs control by calculating a vehicle model simulating the operation of said vehicle according to the gear ratio of said gear-shifting means depending on the torque generated by said driving force generating means and calculating said torque command using a vehicle model speed calculated by the vehicle model and the rotating speed of said driving force generating means.

For example, in a case where said driving force generating means is a motor, at the time of starting of said motor, the driving force of the motor becomes a torque to move the vehicle, which has a certain vehicle weight, through a drive shaft to start movement of the vehicle. Therein, the driving system can be considered as a resonant system in which the inertia of motor and the inertia of the vehicle are connected to both ends of a thin drive shaft, and further the resonant system contains a supporting body for supporting a driving force generating means. Therefore, at the time when a large driving force is required of the motor, such as when starting or when passing another vehicle, the shaft torque driving the vehicle vibrates due to the of the system in some cases.

At this time, the control means executes a calculation of a vehicle model simulating the operation of said vehicle using the torque command for the motor as an input. The calculation obtains the vehicle speed for the torque command to the motor using the inertia of the vehicle model, which is the sum of the inertia of the motor and the inertia of the vehicle converted to the motor side base. Since the inertia of vehicle is generally very large compared to the inertia of the motor, the speed of the vehicle actually vibrates little even when the motor vibrates. Therefore, the vehicle model speed calculated by the vehicle model almost agrees with the vehicle speed. Then, the motor speed is detected to calculate the difference between the vehicle model speed and the motor speed. A vibration compensating torque is calculated by executing a calculation proportional to the speed difference and a calculation having a given transfer function. The motor torque command is calculated by adding the vibration compensating torque to a standard torque calculated from the amount of depression of the accelerator or brake. The motor is controlled with the motor torque command. By the motor in such a manner, when the motor speed is larger than the vehicle speed, the motor is controlled so as to decrease the motor torque. And, when the motor speed is smaller than the vehicle speed, the motor is controlled so as to increase the motor torque. The motor speed is, therefore, controlled so as to agree with the vehicle speed and, consequently the vibration can be suppressed. Thereby, the vehicle can be smoothly driven without vibration of the vehicle even at the time of starting of the vehicle when a large torque is required.

The control according to the present invention is characterized by controlling the motor torque in accordance with the difference between the motor speed and the vehicle speed. The excellent point of the present invention is that the detected speed is obtained by detecting the speed of the driving force generating means, that is, by detecting the speed of the motor and by calculating the difference between the detected speed and the simulated vehicle speed. The vibration may be suppressed by controlling the motor torque through detecting the speed of the drive side, that is, detecting the vehicle speed, and through calculating the difference between the detected speed and the simulated motor speed. In the present invention, however, the system is so constructed that the detected speed is the speed of the driving force generating means, that is, the motor side. The reason such a construction is employed is because, in the case of a vehicle, the inertia of the driving force generating means is generally smaller than the inertia of the vehicle in the drive side. Thereby, according to the present invention, the apparent sensitivity of the sensor detecting the speed is increased and the vibration can be effectively suppressed.

For the second object, by performing a calculation of the vehicle with changes in inertia of the vehicle using the gear ratio of the gearbox, it is possible to obtain a vehicle model speed corresponding to the actual vehicle speed. Since the vibration component of the vehicle can be obtained by using the vehicle model speed and the motor speed of the motor, the vibration compensating torque is calculated from these values. By doing so, in a case of a vehicle having a gearbox, the vibration of the vehicle can be suppressed.

DETAILED DESCRIPTION OF THE PREFERRED EMBODIMENTS

Figure 1:
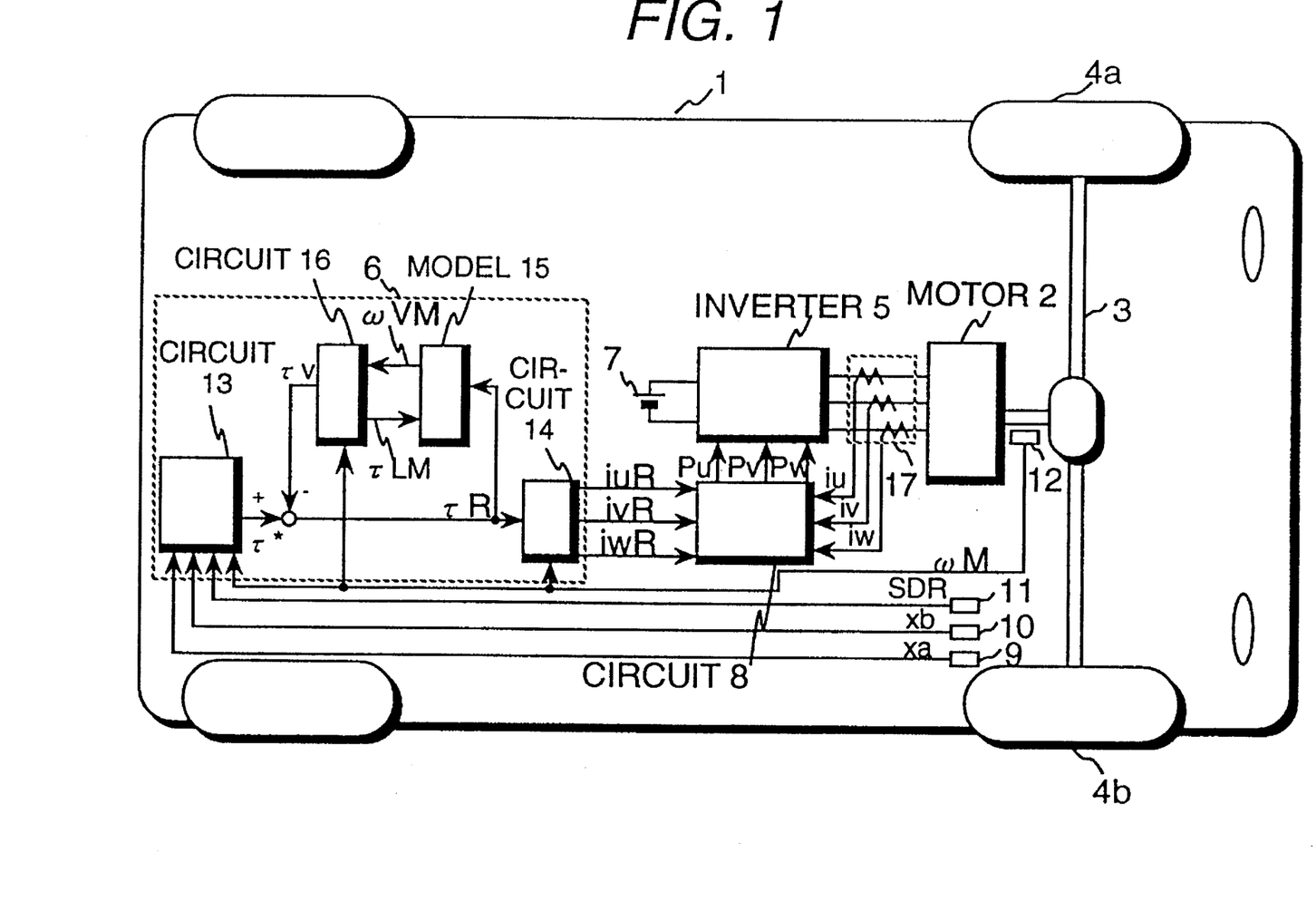
FIG. 1 is a diagram showing the construction of an embodiment of an electric vehicle in accordance with the present invention in which a torque command is used as an input to a vehicle model.

An embodiment of the present invention will be described below, referring to FIG. 1. FIG. 1 shows an embodiment where an electric vehicle 1 is driven by an induction motor 2. With the operation of the induction motor 2, front wheels 4a, 4b of the electric vehicle 1 are rotated through a wheel shaft 3 to move the electric vehicle forward or backward.

Figure 2:
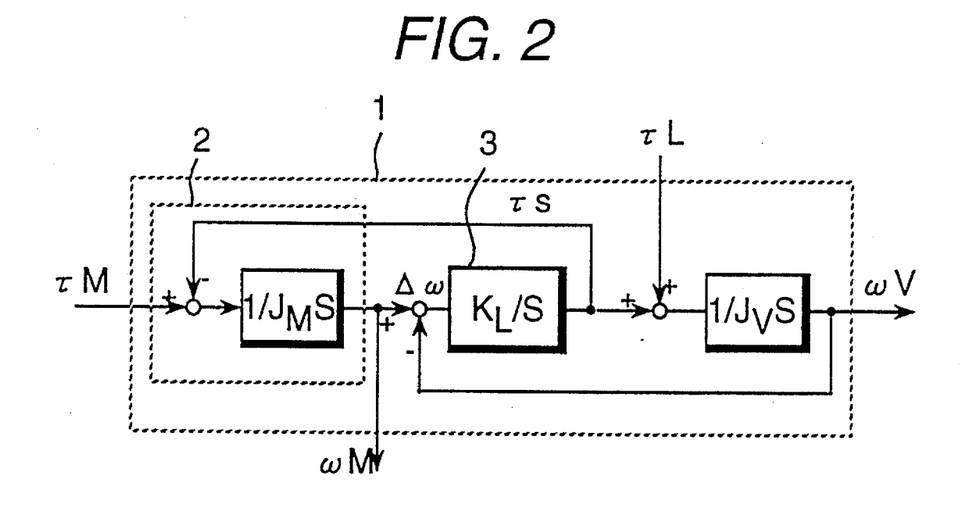
FIG. 2 is a block diagram showing the control object of the motor driving system in FIG. 1.

When the driving system of the electric vehicle 1 is expressed by a block diagram, FIG. 2 can be obtained. The driving system can be considered to have a motor inertia $J_M$ of the induction motor 2, a vehicle inertia $J_V$, which is the vehicle weight equivalently transformed into an inertia in the rotating direction as seen from the side of the induction motor 2, and a torsional rigidness $K_L$ of the wheel shaft 3 connecting these inertias. In FIG. 2, when motor torque $\tau_M$ is generated, the motor inertia $J_M$ is driven by the difference of the motor torque and the shaft torque $\tau_S$ to increase the motor speed $\omega_M$. Since the integration of the speed difference $\Delta\omega$ between the motor speed $\omega_M$ and the vehicle speed $\omega_V$, which is a vehicle speed v in the forward-backward direction equivalently transformed into the rotating direction of the motor speed $\omega_M$, corresponds is to the torsion angle in the wheel shaft 3, the integration multiplied by the torsional rigidness $K_L$ becomes the shaft torque $\tau_S$. The vehicle inertia $J_V$ is driven by the sum of the shaft torque $\tau_S$ and a load torque $\tau_L$ to increase the vehicle speed $\omega_V$. Therein, there exists a natural resonant frequency between the motor inertia $J_M$ and the vehicle inertia $J_V$ determined by the magnitude of the torsional rigidness $K_L$. In a case where the torsional rigidness $K_L$ is small, the shaft torque $\tau_S$ becomes sufficient to rotate the motor inertia $J_M$ and the vehicle inertia $J_V$ in the reverse direction, respectively, when the wheel shaft 3 is largely twisted. This is the cause of back-and-forth vibration at the time of starting of a vehicle. The object of the present invention is to provide a method to solve this phenomenon, which will be described later. In FIG. 1, an inverter 5 is controlled by the three-phase PWM pulses PU, PV, PW, output from a current control circuit 8, and converts the direct current voltage of a battery 7 to the three-phase alternating current voltage to be applied to the induction motor 2. The current control circuit 8 outputs the three-phase PWM pulses PU, PV, PW with a current feedback control so that the currents iU, iV, iW in the respective phases flowing in the induction motor 2 are detected by current sensors 17 and fed back to the current control circuit 8, which also receives three-phase current commands iUR, iVR, iWR output from a control unit 6. With the above control, the three-phase currents iU, iV, iW flowing in the motor operate as direct current commands, respectively, and the induction motor 2 can generate a proper torque.

Next, the control unit for executing a control calculation for generating a proper torque will be described. The control unit 6 comprises a standard torque calculating circuit 13, a motor control circuit 14, a vehicle model 15 and a torque compensating circuit 16. The standard torque calculating circuit 13 determines a standard torque $\tau^*$ to accelerate and decelerate the electric vehicle 1 using an acceleration signal $X_a$, a deceleration signal $X_b$, a shift signal $S_{DR}$, a motor speed signal $\omega_M$ of the induction motor output from an accelerator pedal 9, a brake pedal 10, a shift lever 11, and a speed detector 12, respectively. The standard torque calculating circuit 13 executes a calculation such that the standard torque $\tau^*$ is increased corresponding to the magnitude of the acceleration signal $X_a$ and decreased corresponding to the magnitude of the deceleration signal $X_b$. The shift signal $S_{DR}$ is a signal to control switching between forward-moving and backward-moving directions of vehicle operation and is used to change the sign of the standard torque $\tau^*$ in a case of backward moving operation. By decreasing the absolute value of the standard torque $\tau^*$ as the motor speed $\omega_M$ increases, the standard torque calculation is performed so as to fit to the general driving feelings. When the standard torque $\tau^*$ obtained through the above process is output from the standard torque calculating circuit 13, the difference between the standard torque and a compensating torque $\tau_V$ described later is calculated to obtain a torque command $\tau_R$. A motor control circuit 14, to which the torque command $\tau_R$ is input, executes a vector control calculation, commonly well-known, using the torque command $\tau_R$ and the motor speed $\omega_M$. The vector control is a method to improve the control capability by linearizing the torque control characteristic of an alternating current motor, such as induction motor or the like. In a case of using an induction motor 2, a magnetic flux current command iM for generating a secondary magnetic flux in the induction motor 2 and a torque current command iT intersecting the magnetic flux current command are calculated using the torque command $\tau_R$ and the motor speed $\omega_M$. Then, by calculating a transformation of the coordinate system, current commands iUR, iVR, iWR are obtained from the magnetic flux current command iM and the torque current command iT. Therein, it is important in the vector control calculation that the angle of the secondary magnetic flux in the induction motor and the angle of the magnetic flux current command iM in the rotating coordinate system agree with each other. Hereinafter, the angle in the rotating coordinate system will be referred to as a magnetic flux angle $\theta O$. By performing the vector control, the motor torque $\tau_M$ generated in the induction motor 2 can be made to agree with a value equal to the torque command $\tau_R$, even at a transient period.

Next, the vehicle model 15 and the torque compensating circuit 16, which are important elements of the present invention, will be described. The vehicle model 15 simulates the operation of the vehicle for values of the motor torque $\tau_M$. In the embodiment, a vehicle model speed $\omega_{VM}$ simulates the vehicle speed $\omega_V$ using the torque command $\tau_R$ instead of the motor torque $\tau_M$. The vehicle model speed $\omega_{VM}$ is also equivalently transformed into the rotating direction of the motor speed $\omega_M$. Then, the torque compensating circuit 16 receives the motor speed $\omega_M$ and the vehicle model speed $\omega_{VM}$ and calculates a compensated torque $\tau_V$ to suppress the vibration of the vehicle. Further, the torque compensating circuit calculates a model load torque $\tau_{LM}$ estimating the value of load torque $\tau_L$ to output to the vehicle model 15.

Figure 3:
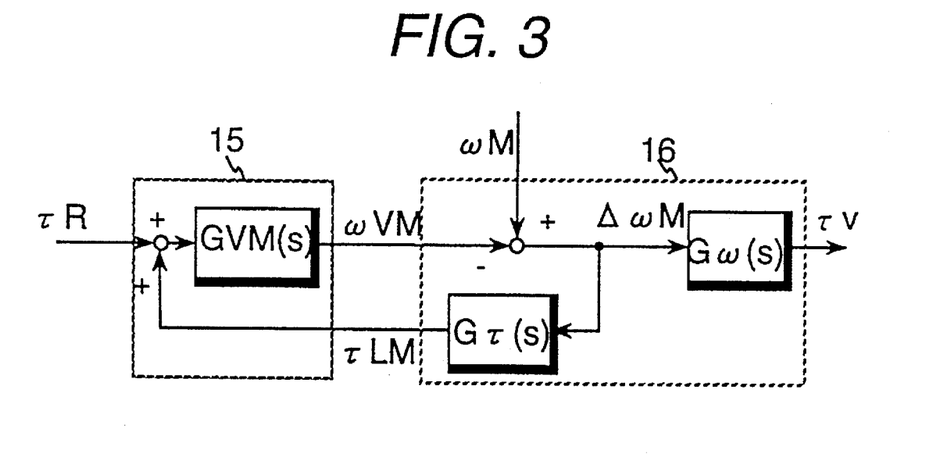
FIG. 3 is a block diagram showing the contents of the calculation in the vehicle model and in the torque compensating circuit in FIG. 1.

FIG. 3 shows the calculation carried out in the vehicle model 15 and the torque compensating circuit 16 using a block diagram. The vehicle model 15 calculates the sum of the torque command $\tau_R$ and the model load torque $\tau_{LM}$ calculated in the torque compensating circuit 16. By regarding the sum of the torques as the practical torque for driving the vehicle, the vehicle model speed $\omega_{VM}$ is calculated according to a vehicle model characteristic $G_{VM}(s)$. Although various selections of the vehicle model characteristic $G_{VM}(s)$ can be considered, the following equation is employed here as one of the simplest characteristics.

$$G_{VM}(s)=1/\{(J_M+J_V)s\} \quad \text{(Equation 1)}$$

This corresponds to the characteristic in which the torsion rigidness $K_L$ is very large in FIG. 2. Since the vehicle model 15 operates to perform a simulation of the operation of the vehicle by nature, the vehicle model may simulate the operation of the resonance system shown in FIG. 2. However, in the embodiment, by considering the fact that the vehicle inertia $J_V$ is larger than the motor inertia $J_M$, the vehicle speed $\omega_V$ may be simulated using the characteristic expressed by Equation 1.

The torque compensating circuit 16 calculates a model speed difference $\Delta\omega_M$ from the difference between the motor speed $\omega_M$ and the vehicle model speed $\omega_{VM}$. The model speed difference $\Delta\omega_M$ corresponds to a value simulating the speed difference $\Delta\omega$ in FIG. 2. Then, a vibration compensating calculation $G\omega(s)$ is executed using the model speed difference $\Delta\omega_M$ to calculate a compensating torque $Y_V$. The vibration compensating calculation $G\omega(s)$ may be performed by combining proportional, integral and differential control calculations. Therein, the vibration can be almost suppressed by simply performing a proportional control calculation. The reason is that the calculations in the vehicle model 15 and in the torque compensating circuit 16 are equivalent to the detection of the speed difference $\Delta\omega$ as far as the vehicle model speed $\omega_{VM}$ agrees with the vehicle speed $\omega_V$. In FIG. 2, it is effective for suppressing the vibration to decrease the shaft torque $\tau_S$ which is the cause of the vibration. Therefore, the component of the vibration can be suppressed in the beginning stage by simply performing a proportional calculation of the speed difference $\Delta\omega$ to be used for feed-back because the vibration in the shaft torque $\tau_S$ is the integration of the speed difference $\Delta\omega$ which is a differential element of the shaft torque. That is, simply preforming a proportional calculation is effective in suppressing the vibration.

The load torque compensating calculation $G\tau(s)$ is executed using the model speed difference $\Delta\omega_M$ and the calculated result is regarded as the model load torque $\tau_{LM}$. Since the model speed difference $\Delta\omega_M$ extracted from the vibration component relates to the load torque $\tau_L$, a model load torque $\tau_{ML}$ simulating the load torque $\tau_L$ can be calculated by inputting the model speed difference $\Delta\omega_M$. Although the load torque compensating calculation $G\tau(s)$ can obtain the model load torque $\tau_{LM}$ with a proportional calculation, integral and differential calculations may be employed as well. By using the model load torque $\tau_{LM}$ obtained in this way in the calculation of the vehicle model 15, it is possible to simulate the state of an actual vehicle.

According to the embodiment, since a vehicle model speed $\omega_{VM}$ almost agreeing with the vehicle speed $\omega_V$ can be obtained by simulation of the vehicle model without directly detecting the vehicle speed $\omega_V$, the vehicle can be started or accelerated without vibration even when the driving system of the vehicle has a mechanical resonance. Therefore, there is an advantage in that a driver can comfortably drive the vehicle.

Figure 4:
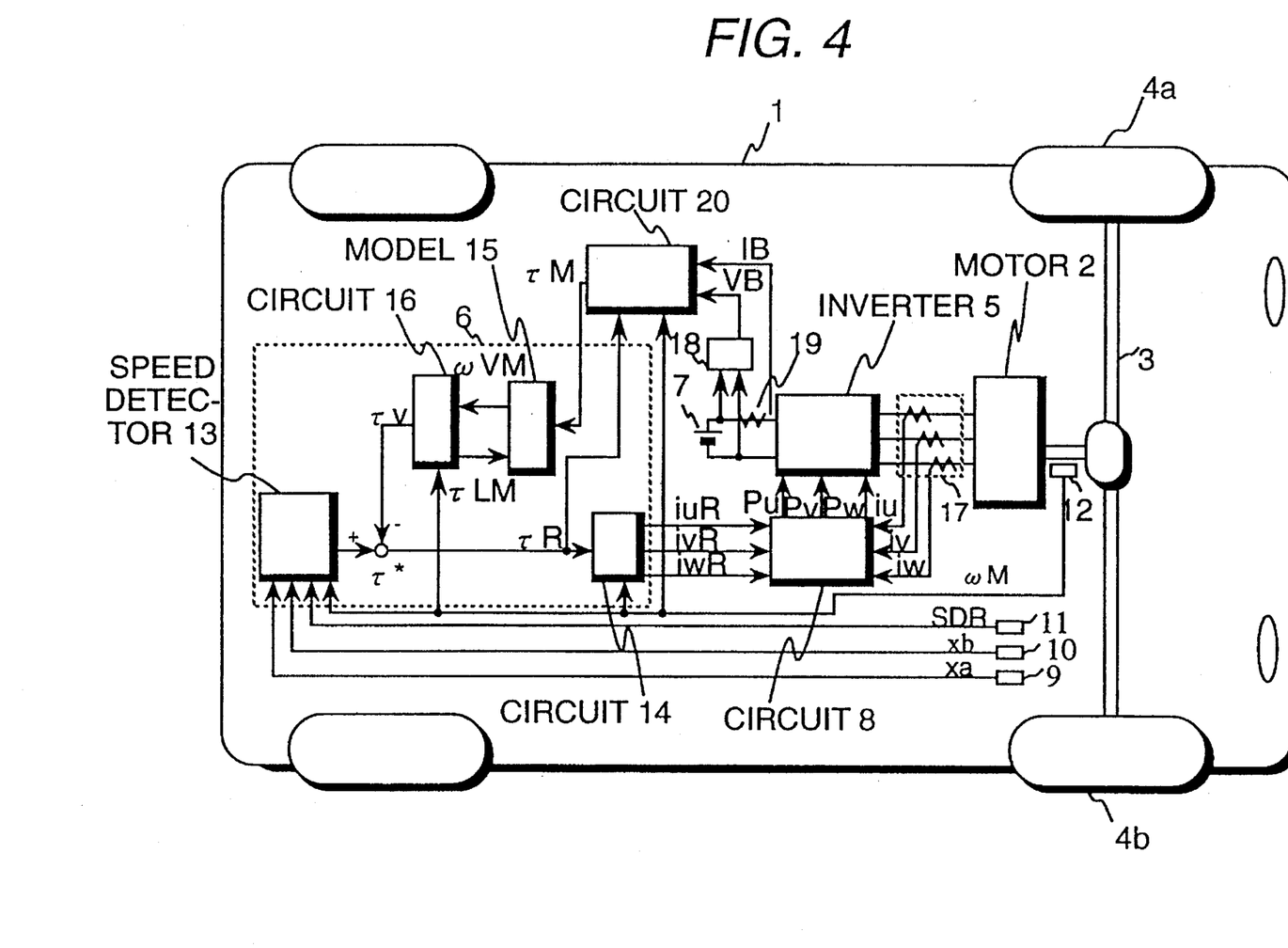
FIG. 4 is a diagram showing the construction of another embodiment different from that shown in FIG. 1 in which motor torque calculated from the electric power of a battery is used as an input to a vehicle model.

FIG. 4 shows another embodiment where, in contrast to the embodiment in FIG. 1, motor torque, which is output power of the induction motor, is used as an input to the vehicle model. The vehicle model 15 receives a motor torque $\tau_M$ calculated by a torque calculating circuit 20 instead of the torque command $\tau_R$. The motor torque $\tau_M$ is detected by use of a voltage sensor 18, a current sensor 19 and a torque calculating circuit 20. The voltage sensor 18 and the current sensor 19 detect the battery voltage $V_B$ and the battery current $I_B$ of a battery 7. Then, the battery voltage $V_B$ and the battery current $I_B$ are input to the torque calculating circuit 20. The torque calculating circuit 20 receives the motor speed $\omega_M$ and the torque command $\tau_R$ other than the above input.

Figure 5:
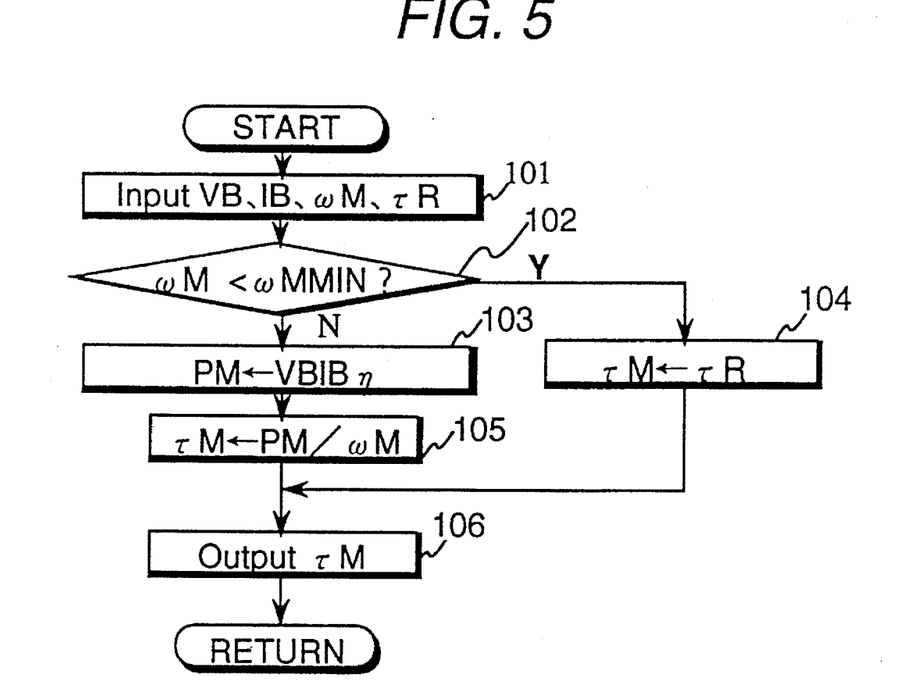
FIG. 5 is a flow-chart showing the processing method in the torque calculating circuit in FIG. 4.

FIG. 5 shows the processing content of the torque calculating circuit 20. After inputting four signals in Step 101, in Step 102 it is judged whether the motor speed $\omega_M$ is above a calculation minimum speed $\omega_{MMIN}$ or not. If the motor speed $\omega_M$ is above a calculation minimum speed $\omega_{MMIN}$, the processing goes to Step 103. If not, the processing jumps to Step 104. In Step 103, the motor electric power $P_M$ output from the induction motor 2 is calculated by obtaining the product of the battery voltage $V_B$ and the battery current $I_B$ and an efficiency $\eta$.

The product of $I_B$ and $V_B$ is the battery power output from the battery, and the product of this value and the efficiency $\eta$ including inverter loss and motor loss, becomes the motor power $P_M$. Next, in Step 105, a calculation is executed by dividing the motor power $P_M$ with the motor speed $\omega_M$, and the quotient ($P_M/\omega_M$) is regarded as the motor torque $\tau_M$. Therein, the efficiency $\eta$ may be obtained from a method where the values in the operating points of the induction motor are tabulated or a method where the value is regarded as a constant value. The motor torque $\tau_M$ is output to the vehicle model 15 in Step 106.

In the case of jumping to Step 104 when the motor speed $\omega_M$ is below the calculating minimum speed $\omega_{MMIN}$, the torque command $\tau_R$ is regarded as the motor torque $\tau_M$. The value is output in Step 106. Since the accuracy in the value ($P_M/\omega_M$) is degraded and an accurate value of motor torque $\tau_M$ cannot be obtained in some cases when the motor speed $\omega_M$ is small, the torque command $\tau_M$ is used instead.

By employing this embodiment, since the calculation in the vehicle model 15 is executed by using the motor torque $\tau_M$ actually being output by the induction motor 2, the vehicle can be simulated with high accuracy and the vehicle model speed $\omega_{VM}$ can be made to agree with to the vehicle speed $\omega_V$. Especially, even when the motor torque $\tau_M$ does not agree with the torque command $\tau_R$, the driving control can be performed without decreasing the effect of suppressing the vibration. Further, there is an advantage in that the driving control can be performed without decreasing the effect of suppressing the vibration during slow driving, since the motor torque $\tau_M$ is switched to the torque command $\tau_R$ when taking the degradation in the detecting accuracy into consideration.

Figure 6:
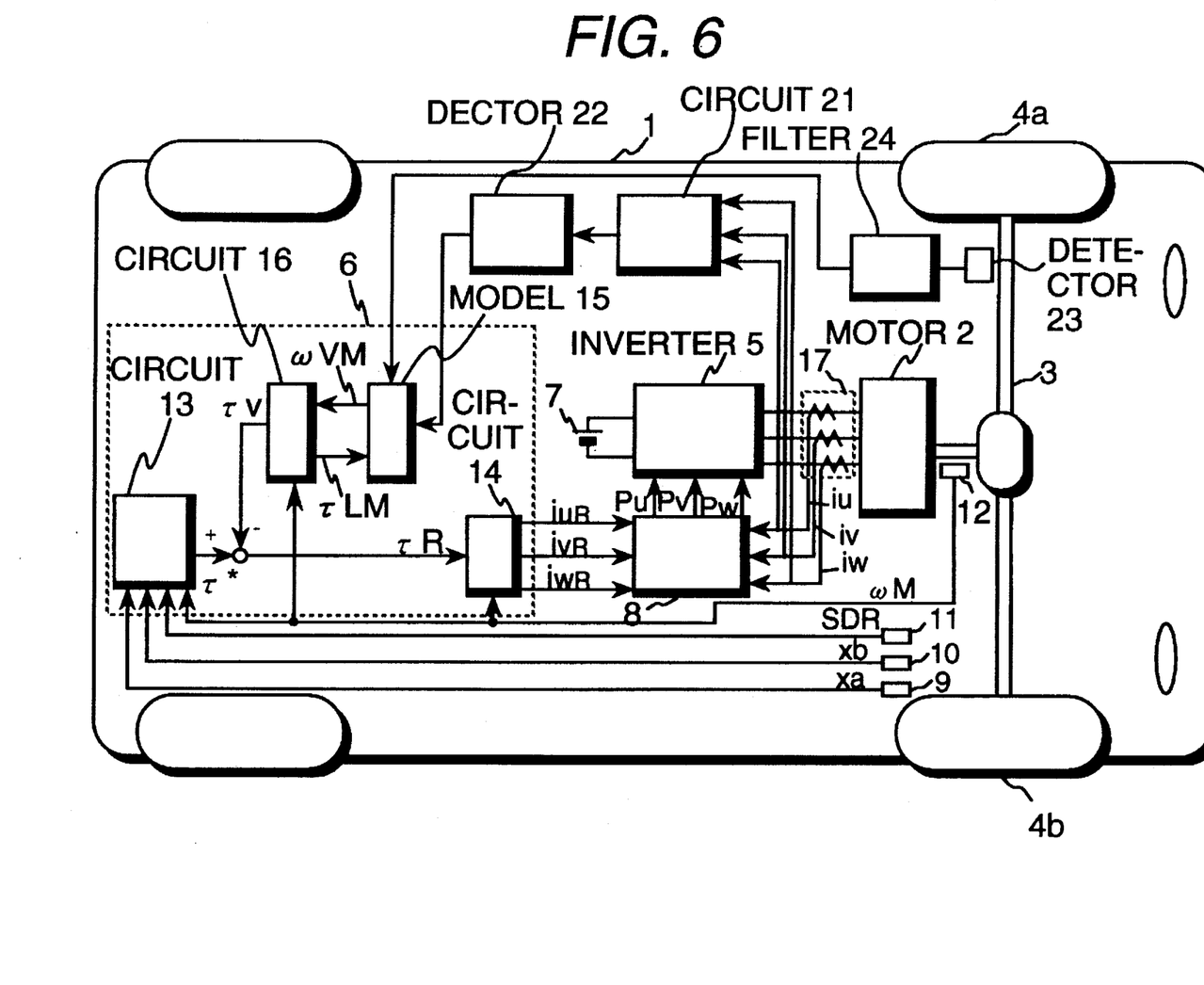
FIG. 6 is a diagram showing the construction of another embodiment different from that shown in FIG. 4 in which motor torque detected from the three-phase currents of the motor is used as an input to a vehicle model.

FIG. 6 shows a further embodiment where, in contrast to the embodiment in FIG. 4, a different method of detecting the input to the vehicle model is employed. In FIG. 6, the motor torque $\tau_M$ and the model load torque $\tau_{LM}$ input to the vehicle model 15 are detected as follows. The motor torque $\tau_M$ is calculated using a coordinate transferring circuit 21 and a torque detecting circuit 22. The motor control circuit 14 outputs a magnetic flux angle $\theta_0$ described above to a coordinate transferring circuit 21. Calculation is performed on the coordinate transformation using the magnetic flux angle $\theta_0$ so that the three-phase currents iU, iV, iW are transferred from the static coordinate system to a rotating coordinate system with the magnetic flux angle $\theta_0$. Thereby, a magnetic flux current iM for generating a secondary magnetic flux and a torque current iT proportional to the motor torque $\tau_M$ of the induction motor 2 can be obtained. Then, the torque detecting circuit 22 receiving the magnetic flux current iM and the torque current iT calculates a motor torque $\tau_M$ from the magnetic flux current iM and the torque current iT.

The model load torque $\tau_{LM}$ is calculated using a shaft torque detector 23 and a filter 24. A shaft torque $\tau_S$ is detected by the shaft torque detector 23 attached to the wheel shaft 3, and is input to the filter 24. The filter 24 has a low-pass-filter characteristic which passes only signals in a low frequency range. With the calculation, a model load torque $\tau_{LM}$ is obtained from the shaft torque $\tau_S$.

Since the vehicle model 15 receives the motor torque $\tau_M$ and the model load torque $\tau_{LM}$, that is, calculation of the vehicle model is performed using the actual state of the vehicle, a further accurate vehicle model speed $\omega_{VM}$ can be obtained. Compared to the embodiment in FIG. 4, this embodiment has an advantage in that the motor torque $\tau_M$ can be detected with high accuracy even in a low speed range.

Figure 7:
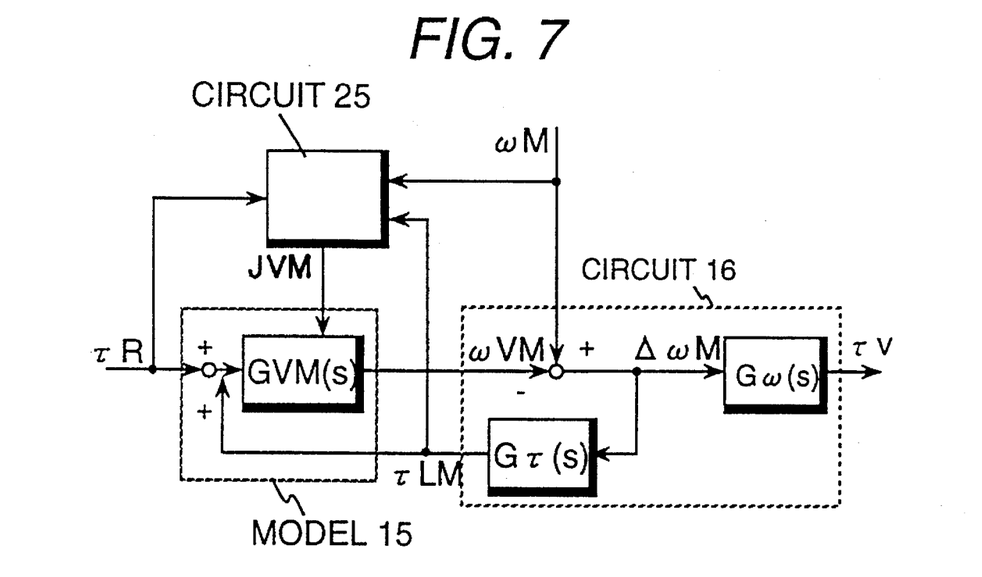
FIG. 7 is a block diagram showing a total inertia calculating circuit for estimating a total inertia of the sum of the inertia of the vehicle and the inertia of the motor, which may be added to FIG. 1.
Figure 8:
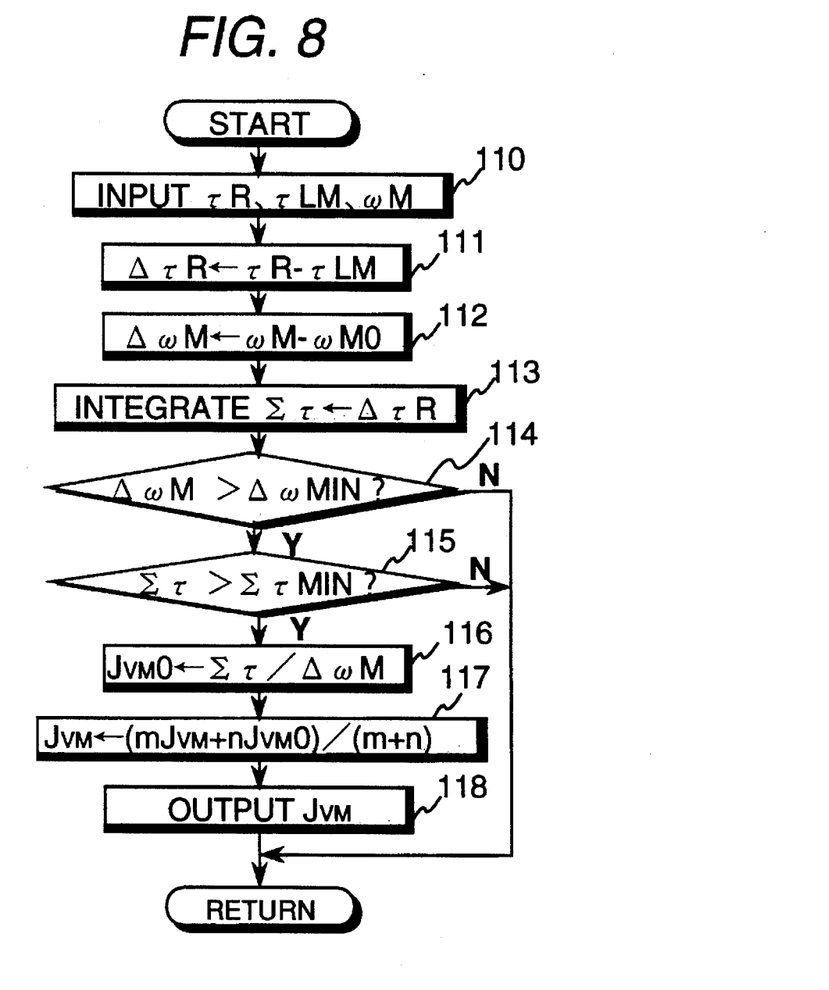
FIG. 8 is a flow-chart showing the estimating method of the total inertia in the total inertia calculating circuit shown in FIG. 7.

FIG. 7 shows an embodiment where a total inertia calculating circuit 25 for estimating a total inertia $J_{VM}$ is added to the embodiment in FIG. 1. The total inertia calculating circuit 25 calculates the total inertia $J_{VM}$ by receiving a torque command $\tau_R$, motor speed $\omega_M$ and model load torque $\tau_{LM}$ outputs it to the vehicle model 15. Here, the total inertia $J_{VM}$ is the sum of the vehicle inertia $J_V$ and the motor inertia $J_M$. Therefore, when the vehicle model speed $\omega_{VM}$ is calculated using the method expressed by Equation 1 in the vehicle model 15, the total inertia $J_{VM}$ is used. FIG. 8 shows the processing method in the total inertia calculating circuit 25. After inputting a torque command $\tau_R$, a value of motor speed $\omega_M$ and a model load torque $\tau_{LM}$ in Step 110, in Step 111 the difference between the torque command $\tau_R$ and the model load torque $\tau_{LM}$ is set as an acceleration component torque command $\Delta\tau_R$. Since the torque to accelerate the vehicle can be considered as the difference between the motor torque $\tau_M$ and the load torque $\tau_L$, the calculated result obtained in the vehicle model 15 is the acceleration component torque command $\Delta\tau_R$. Next, in Step 112, motor speed $\omega_M$ is reduced by a motor speed $\omega_{M0}$ at the time precedent by a given time period T and the value is set as a speed changing amount $\Delta\omega_M$. In Step 113, the acceleration component torque command $\Delta\tau_R$ is integrated from the time precedent by the given time period T to the present time and the value is set as a torque integration value $\Sigma\tau_R$. In Steps 114 and 115, judgments are executed to maintain the desired accuracy in the calculations. That is, in Step 114, if the speed changing amount $\Delta\omega_M$ is smaller than a speed changing set value $\Delta\omega_{MIN}$, the total inertia $J_{VM}$ is not calculated and the processing is completed. Since the measuring of the total inertia $J_{VM}$ requires a change in the vehicle speed to a certain extent, such a judgment is added. In Step 115, if the torque integration value $\Sigma\tau_R$ is smaller than a torque integration set value $\Sigma\tau_{MIN}$, the total inertia $J_{VM}$ is not calculated and the processing jumps. The purpose of the jump is to consider a case where the speed of the vehicle is changing as a result of a small torque to accelerate the vehicle, that is, under a condition where there is a small value of the acceleration component torque command $\Delta\tau_R$. For example, the case corresponds to that which occurs when the vehicle is accelerated by gravity on a downward slope. In such a case, the processing is not executed, since the total inertia $J_{VM}$ cannot be accurately calculated.

On the other hand, if the speed changing amount $\Delta\omega_M$ is larger than a speed changing set value $\Delta\omega_{MIN}$, and if the torque integration value $\Sigma\tau_R$ is larger than a torque integration set value $\Sigma\tau_{MIN}$, the processing is executed in Step 116, Step 117 and Step 118. In Step 116, the calculation $\Sigma\tau/\Delta\omega_M$ is executed and the value is set as a total inertia calculated value $J_{VM0}$. Since the value of the torque integration value to accelerate divided by the speed changing amount is the total inertia calculated value $J_{VM0}$, this calculation is executed. Then, in Step 117, the total inertia calculated value $J_{VM0}$ in the preceding calculation and the total inertia calculated value $J_{VM0}$ now are weighted by given weighting coefficients m, n to calculate a total inertia $J_{VM}$ again. By setting m>n, the calculated value is gradually converged to the true value of the total inertia $J_{VM}$. The value is output in Step 118 and the processing is completed.

By employing this embodiment, since the total inertia can be obtained when the number of passengers or the embarkation weight on the vehicle is changed, this embodiment has an advantage in that it will prevent degradation in the control capability for suppressing the vibration accompanied by the change in the total inertia.

Figure 9:
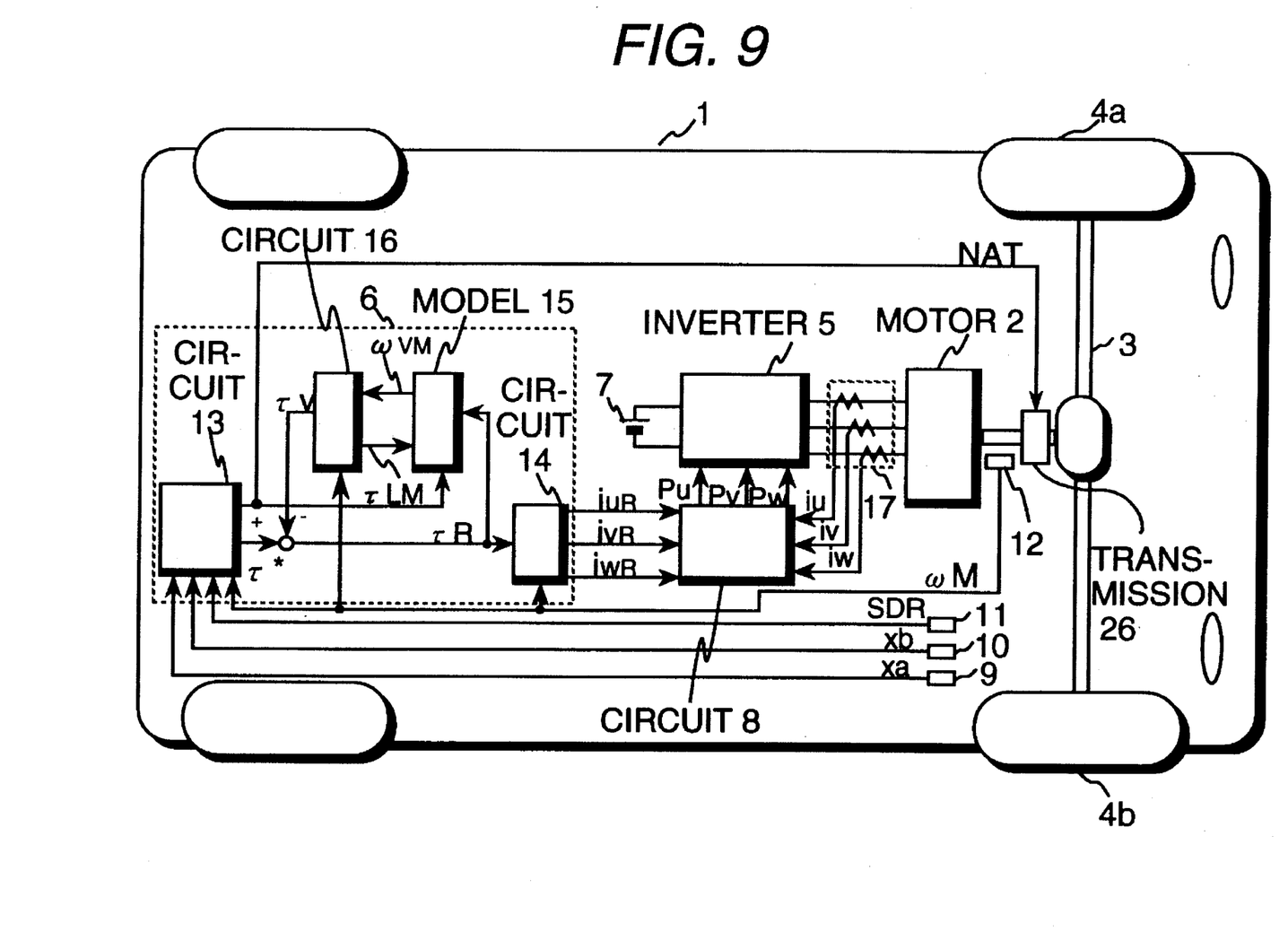
FIG. 9 is a diagram showing the construction of an embodiment in a case of driving an electric vehicle having an automatic transmission.
Figure 10:
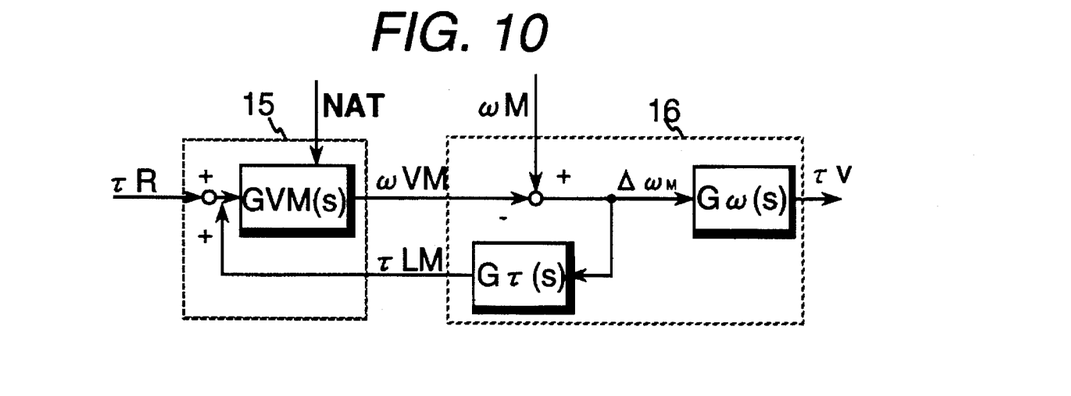
FIG. 10 is a block diagram showing a change in calculation of the vehicle model depending on the gear ratio in the automatic transmission.

FIG. 9 shows a further embodiment of an electric vehicle having an automatic transmission. The different points of FIG. 9 from FIG. 1 will be described below. In a case where an automatic transmission 26 is employed in the vehicle, a standard torque calculating circuit 13 calculates an optimum gear ratio $N_{AT}$ using a motor speed $\omega_M$ and a standard torque $\tau^*$ obtained by calculation. The gear ratio of the automatic transmission 26 is automatically changed according to the gear ratio $N_{AT}$ to convert a motor torque $\tau_M$ of an induction motor 2 and transmit it to a wheel shaft 3. Further the gear ratio $N_{AT}$ is input to a vehicle model 15 in a control unit 6. As shown in FIG. 10, the vehicle model 15 uses the gear ratio $N_{AT}$ and the following equation in calculating a vehicle model characteristic $G_{VM}(s)$ to obtain a vehicle speed $\omega_V$.

$$G_{VM}(s)=1/\{(J_M+J_V N_{AT2})s\} \quad \text{(Equation 2)}$$

Therein, the vehicle speed $\omega_V$ is, of course, a value converted to the motor shaft base.

By executing the above calculations, since the vehicle model can be simulated with an inertia while taking the gear ratio into consideration even in a case of an electric vehicle having an automatic transmission, there is an advantage in that the vehicle can always be driven while suppressing vibration regardless of the magnitude of the gear ratio.

Figure 11:
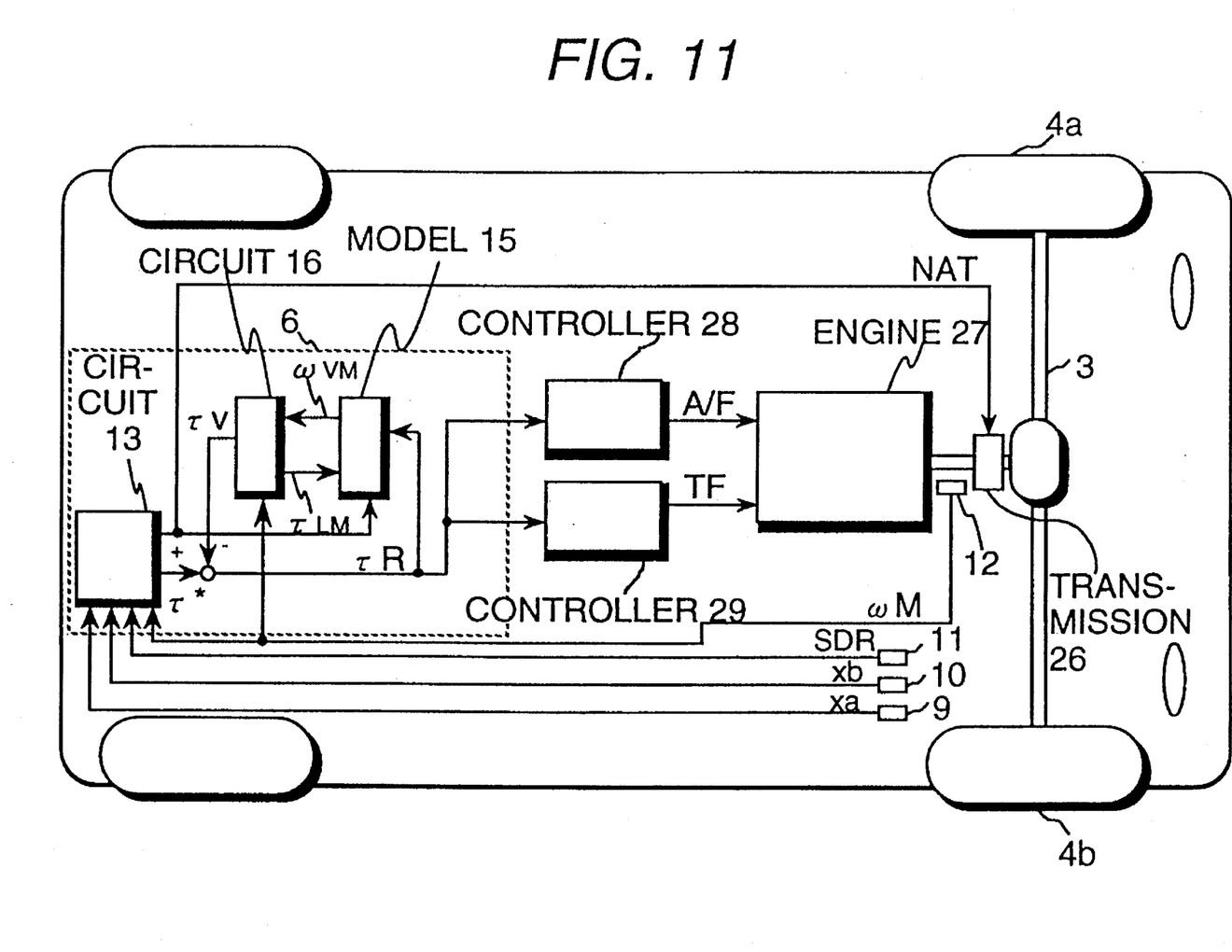
FIG. 11 is a diagram showing the construction of an embodiment of a vehicle driven by an engine in which driving control is executed using a vehicle model.

FIG. 11 shows an embodiment in which a vehicle is driven by using an engine 27 instead of the induction motor 2 in FIG. 9. The different point in FIG. 11 from FIG. 9 is that an engine 27, an air-fuel ratio controller 28 and an ignition timing controller 29 are used instead of the induction motor 2, the inverter 5, the current control unit 8 and the motor control unit 14. The air-fuel ratio controller 28 controls the ratio of air and fuel, that is, controls the air-fuel ratio and regulates the fuel injection rate corresponding to a torque command $\tau_R$ obtained by using the vehicle model 15. The ignition timing controller 29 controls ignition timing of an ignition coil corresponding to the torque command $\tau_R$. With the control, the engine 27 generates a torque equivalent to a torque command $\tau_R$ calculated in a controller 6 while optimizing the fuel consumption rate. Thereby, the vehicle is driven by the engine through an automatic transmission 26. In this case, since the vibration component is detected using a vehicle model speed $\omega_{VM}$ calculated in the vehicle model 15 and a speed $\omega_M$ of the engine 27, the vibration can be suppressed by a compensating torque $\tau_V$.

By employing this embodiment, the vibration generated in the internal combustion engine, such as a gasoline engine, can be suppressed.

Although embodiments according to the present invention using an induction motor for driving have been described, the present invention can be applied to a case of using a synchronous type alternating current motor, a direct current motor or the like. Although cases where the vehicle model simulates the inertia and the load torque have been described, the model may be simulated by using the losses of running resistance, the motor and the like, and the resonance characteristic of the mechanical system and so on into consideration. Further, the present invention can be applied to a vehicle having an engine other than a gasoline engine.

According to the present invention, since the vibration phenomenon generated during driving of a vehicle is detected using a vehicle model simulating the motor speed and the vehicle, the vehicle can be accelerated or decelerated while always suppressing vibration with a simple construction, and a vehicle control system which is simple in construction and excellent in driving capability can be provided.

What is claimed is:

1. A vehicle control system for a vehicle, comprising driving force generating means for driving the vehicle, accumulating means for accumulating driving energy for the vehicle, supply means for supplying the energy of said accumulating means to said driving force generating means, and control means for controlling said supply means based on a torque command of said driving force generating means, wherein:

said control means comprises a vehicle model for simulating the speed of the vehicle based on the torque command, and a torque command compensating means for compensating the torque command based on the simulated speed and the rotating speed of said driving force generating means.

2. A vehicle control system according to claim 1, further comprising:

torque detecting means for detecting torque generated by said driving force generating means, said vehicle model being connected to receive the output from said torque detecting means.

3. A vehicle control system for an electric vehicle, comprising a motor for driving the vehicle, accumulating means for accumulating driving energy for the vehicle, electric power converting means for electrically converting the accumulated driving energy to electric energy for driving said motor, and control means for controlling said electric power converting means based on a torque command of said motor, wherein:

said control means comprises a vehicle model for simulating the speed of the vehicle based on the torque command, and torque command compensating means for compensating the torque command based on the simulated speed and the rotating speed of said motor.

4. A vehicle control system according to claim 3, further comprising:

torque detecting means for detecting torque generated by said motor, said vehicle model being connected to receive the output from said torque detecting means.

5. A vehicle control system according to claim 4, wherein:

said torque detecting means detects the torque of said motor from output energy of said electric power converting means.

6. A vehicle control system according to claim 4, wherein:

said torque detecting means detects the torque of said motor from a magnetic flux component current and a torque component current of said motor.

7. A vehicle control system according to claim 3, further comprising:

load estimating means for estimating the load torque of the vehicle from quantities of a state of the vehicle, and wherein the operation of the vehicle is calculated using a value of estimated torque output from said load estimating means.

8. A vehicle control system according to claim 3, further comprising:

means for determining a model inertia simulating the inertia of said vehicle for use in said vehicle model from the torque command and qualities of a state of the vehicle.

9. A vehicle control system for an electric vehicle, comprising a motor for generating a driving force for driving the vehicle, gear-shifting means for transmitting the driving force of said motor to the vehicle with a selected gear ratio, accumulating means for accumulating driving energy for the vehicle, electric power converting means for electrically converting the accumulated driving energy to electric energy for driving said motor, and control means for controlling said electric power converting means based on a torque command of said motor, wherein:

said control means comprises a vehicle model for simulating the speed of the vehicle, which changes in accordance with the gear ratio of said gear-shifting means, based on the torque command and a torque command compensating means for compensating the torque command based on the simulated speed and the rotating speed of said motor.

10. A vehicle control system for an internal combustion engine vehicle, comprising an engine for generating driving force for driving the vehicle, gear-shifting means for transmitting the driving force of said engine to the vehicle with a selected gear ratio, and control means for controlling said gear-shifting means based on a torque command of said engine, wherein:

said control means comprises a vehicle model for simulating the speed of the vehicle, which changes in accordance with the gear ratio of said gear-shifting means, based on the torque command and a torque command compensating means for compensating the torque command based on the simulated speed and the rotating speed of said engine.

* * * * *